United States Patent [19]

Dinh et al.

[11] 4,435,277
[45] Mar. 6, 1984

[54] PROCESS FOR THE HYDROTREATMENT OF HEAVY HYDROCARBONS IN THE PRESENCE OF REDUCED METALS

[75] Inventors: Chan T. Dinh, Le Vesinet; Alain Desvard, La Celle Saint Cloud; Yves Jacquin, Sevres; Germain Martino, Poissy, all of France

[73] Assignee: Institute Francais du Petrole, Rueil-Malmaison, France

[21] Appl. No.: 368,531

[22] Filed: Apr. 15, 1982

[30] Foreign Application Priority Data

Apr. 15, 1981 [FR] France .................................. 81 07750

[51] Int. Cl.³ .................... C10G 45/08; C10G 47/02; C10G 47/12
[52] U.S. Cl. .................................. 208/108; 208/112; 208/216 R; 208/217; 208/251 H; 208/254 H
[58] Field of Search .................... 208/213, 215, 216 R, 208/251 H, 254 H, 108, 217, 112

[56] References Cited

U.S. PATENT DOCUMENTS

| 3,331,769 | 7/1967 | Gatsis | 208/210 |
| 4,055,483 | 10/1977 | Mertzweiller et al. | 208/213 |
| 4,192,735 | 3/1980 | Aldridge et al. | 208/112 |
| 4,285,804 | 8/1981 | Jacquin et al. | 208/48 R |
| 4,348,270 | 9/1982 | Bearden, Jr. et al. | 208/9 |
| 4,357,229 | 11/1982 | Bearden, Jr. et al. | 208/10 |

Primary Examiner—Delbert E. Gantz
Assistant Examiner—O. Chaudhuri
Attorney, Agent, or Firm—Millen & White

[57] ABSTRACT

A heavy hydrocarbon charge containing sulfur, asphaltenes and/or resins is hydrotreated in the liquid phase at 250°–500° C. under a pressure of 20–350 bars in the presence of a catalyst previously obtained by reacting an organic compound of a transition metal with an organic aluminum compound, in a hydrocarbon free of asphaltene and resin.

The transition metal organic compound is advantageously an iron, nickel, cobalt, molybdenum, tungsten or vanadium acetylacetonate or carboxylate.

15 Claims, No Drawings

PROCESS FOR THE HYDROTREATMENT OF HEAVY HYDROCARBONS IN THE PRESENCE OF REDUCED METALS

The present invention concerns a new process for the hydrotreatment of heavy hydrocarbons issued from petroleum or obtained from coal, wherein the reaction takes place in the liquid phase and is catalyzed by complex catalytic systems of metals in the reduced state.

As used herein, the term "heavy hydrocarbons" means, in particular, distillation straight run residues or vacuum residues of petroleum products or hydrocarbon mixtures issued from the treatment of coal, in particular its liquefaction or its pyrolysis; the heavy hydrocarbons also include heavy crude oils issued from bituminous sand or bituminous shale.

The process also concerns the treatment of the fraction (maltene) obtained by deasphalting the above residues or mixtures.

One object of the catalytic treatment of the invention is to remove pollutants such as sulfur and compounds which are deleterious to the refining stage such as nitrogen, oxygen, metals, particularly nickel and vanadium, and asphaltenes, so that the subsequent step of hydrocracking or catalytic cracking of these heavy residues to light valuable products such as gasoline, gas-oil, and the like is possible.

Another result obtained according to the invention is the reduction of the viscosity and the lowering of the pour point of the hydrocarbon charge.

The complex catalytic systems used according to the present invention are obtained by reaction, before admixture with the charge of hydrocarbons to be treated, containing asphaltenes and/or resins, of at least one transition metal organic compound with at least one organic aluminum compound, said reaction being effected in a hydrocarbon solvent free of asphaltene.

The above reaction leads to the formation of an organic complex, soluble in hydrocarbon medium, containing the transition metal at a valency value lower than the valency value of the same metal in the starting organic compound. The so-obtained catalytic solutions, once prepared, are very active when added to a heavy hydrocarbon charge.

U.S. Pat. No. 4,055,483 describes a catalytic process for the hydrotreatment of hydrocarbon oils containing asphaltenes, wherein the catalyst results from the activation of metals, nickel and vanadium, contained in heavy petroleum residues, by direct addition of triethylaluminum or of vanadyl phthalocyanine and triethylaluminum to the residues to be treated.

The examples of the above-mentioned patent show that the described catalysts are not very efficient.

On the contrary, as it will be shown hereinafter, the catalysts used according to the present invention, catalysts based on reduced metals and previously prepared in a hydrocarbon or hydrocarbon mixture substantially free of asphaltenes, are clearly more active. This difference of behavior may be explained as follows: it is observed that triethylaluminum is violently decomposed when contacted with asphaltenes, while producing a substantial gas evolution and heating. The mixture is no longer able to reduce organic compounds. The reduced metals used as catalysts for the hydrotreatment according to the invention must accordingly be synthesized apart, preliminarily, in hydrocarbons free of asphaltenes, before being used.

The excellent results obtained according to the invention in the hydrogenation of heavy fractions of high pollutant content (sulfur content higher than 0.5% by weight and, in most cases, higher than 1% by weight) are unexpected.

As a matter of fact, it was known to make use of catalysts of the same type for the hydrogenation (saturation) of unsaturated organic compounds, at relatively low temperatures, in most cases from 20° to 200° C., but it was also known that, in said use, the above mentioned catalysts were very sensitive to poisons, particularly to sulfur.

This sensitivity is illustrated by the following example: Benzene is hydrogenated at 165° C. under 7 bars of hydrogen partial pressure with 450 ppm by weight (calculated as nickel) of a catalyst obtained by reacting nickel octoate with triethylaluminum (atomic ratio Al/Ni=3). The hydrogenation rate is 0.45 mole $H_2$/l/min. when the benzene contains less than 1 ppm by weight of sulfur; this rate falls to 0.01 mole $H_2$/liter/minute when the benzene contains 100 ppm by weight of sulfur (thiophene); it is practically nil when the benzene contains 100 ppm by weight of sulfur introduced in the form of Cabimas vacuum residue (2.3% by weight of sulfur; detailed analysis reported hereinafter in the examples).

It is accordingly unexpected that the catalyst may be precisely used for the hydrogenation of heavy residues at a temperature from 250° to 500° C. under a pressure from 20 to 350 bars.

In addition to the sulfur, the treated charges according to the invention usually contain at least 1% of asphaltene and/or resin. They may also contain metals, for example 20 ppm or more of nickel and/or vanadium.

Examples of hydrocarbons to be used for the preparation of the catalysts, are saturated hydrocarbons and aromatic hydrocarbons. The preferred hydrocarbons or hydrocarbon fractions have a normal boiling point or boiling range between 30° C. and 250° C. There can be used, for example, a $C_5$ fraction, a gasoline fraction, a naphtha fraction or a kerosene fraction.

The transition metal organic compounds used for the preparation of the catalytic solutions according to the invention are, for example, the iron, nickel and/or cobalt acetylacetonates, or the metals salts of organic carboxylic acids having, for example, 1 to 22 carbon atoms (preferably 5 to 20), particularly the naphthenates, octoates, 2-ethyl hexanoates, resinates, stearates and oleates of iron, molybdenum, tungsten, nickel, cobalt and/or vanadium. There can also be used alkylphosphates or arylphosphates, for example those of the following metals: iron, cobalt, nickel, vanadium, tungsten and/or molybdenum. Vanadium alkylphosphates are preferred.

More generally, the metals which may be included in the composition of the catalysts are selected from groups Ib, IIb, IVa to VIIa and VIII (Classification of the International Union of Pure and Applied Chemistry).

It is also possible to make use of associations of several metals and preferably: cobalt-molybdenum and nickel-molybdenum.

The reducing agent is an organic aluminum compound, preferably complying with the general formula Al R' R" R'" wherein the radicals R', R", R'", identical or different, designate hydrogen or monovalent hydrocarbon or alkoxy radicals, each containing for example from 1 to 20 carbon atoms, at least one of them being a hydrocarbon or alkoxy radical. The organic aluminum compounds which are particularly preferred are triethylaluminum and triisobutyl aluminum, in view of their ready availability in the trade.

The catalyst can be prepared at ambient temperature, about 20° C. or below (for example 0° C.) and up to, for example, 200° C. However, it is preferred to proceed at temperatures from 80° to 150° C.

The reaction between the metal compound and the reducing agent usually results in gas evolution. The completion of the reaction is characterized by the end of the gas evolution. Generally, the reaction is complete after about 10 minutes, but a longer reduction stage does not affect the qualities of the catalyst.

The preparation must be effected under an inert atmosphere, for example of argon, nitrogen or hydrogen, in view of the sensitivity of the reducing agent to the oxygen of air.

The reducing compound may be used either pure or in solution, for example in a hydrocarbon or an ether.

The preparation mode is not critical: it may either consist of pouring the reducing agent into a solution of the metal compound or the converse.

The atomic ratio Al/metal or transition metals is preferably from 0.1:1 to 15:1.

In the case of preparation of multimetallic catalysts, it is possible either to reduce a mixture of metal compounds or to reduce one of the metal compounds and then to add one or more other metal compounds and reduce them in their turn. In case of use of two distinct catalytic metals, the ratio of the atomic quantities of the two metals may be from 0.01:1 to 50:1, preferably from 0.1:1 to 10:1.

Examples of catalysts are as follows:
iron acetylacetonate+triisobutyl aluminum (Al/Fe=5),
nickel 2-ethyl heptanoate+monoethoxy aluminum dihydride (Al/Ni=4),
cobalt stearate+di-methoxy aluminum monohydride (Al/Co=3.5),
molybdenum naphthenate+diethylaluminum monohydride (Al/Mo=3),
iron octoate+nickel octoate+molybdenum naphthenate+triethylaluminum (Al/Fe+Ni+Mo=3).

Other examples are given hereafter.

Generally, the proportion of fresh catalyst, expressed as the weight of metal in the transition metal compound relative to the weight of the charge of heavy residue to be treated, may vary, for example, from 20 to 10,000 rpm, preferably from 100 to 5000 ppm by weight.

The catalyst may be admixed with the hydrocarbon charge before or during its heating or may be incorporated in said charge after it has already been brought to the hydrotreatment temperature; however, it is preferred to proceed according to the latter procedure.

It is also possible to incorporate the catalytic solution in a carrier, for example alumina, silica, silica-alumina or coal, by proceeding, for example, by impregnation. The impregnated carrier may then be used, for example, in fixed, moving, dispersed or fluid bed. The content of so-deposited metal (or metals) may be for example, from 1 to 50% by weight.

The hydrotreatment temperature may be from 250° to 500° C., preferably from 320° to 450° C.

The total operating pressure may be from 20 to 350 bars, preferably from 90 to 200 bars.

The hydrotreatment reaction may be conducted in the presence of hydrogen or in the presence of a mixture of hydrogen with hydrogen sulfide.

If so desired, it is possible to presulfide the catalytic solution, for example with hydrogen sulfide, before admixing it with the hydrocarbon charge.

This results in the appearance of a finely dispersed solid phase having catalytic properties.

At the end of the hydrotreatment reaction, the reaction products may be separated by any known means; particularly the liquid hydrocarbon may be separated from the catalyst by settling, filtering, centrifugation or any other equivalent means.

The recovered catalyst may be reused.

ANALYSIS METHODS AND EXPRESSION OF THE RESULTS

By asphaltenes is meant the fraction of heavy products which precipitate by addition of n-heptane under conditions of Standard NF T 60115.

The asphaltene conversion is expressed and calculated as follows:

$$\%HDA=(A_o-A)/A_o \times 100$$

$A_o$: asphaltene percent in the initial charge
$A$: remaining asphaltene percent determined in the liquid phase of the taken sample, after decantation or centrifugation.

By resin, is meant the fraction of heavy products precipitated by addition of isopropanol after previous removal of the asphaltenes. The conditions of the determination are similar to those described in Standard NF T60115.

The resin conversion rate is expressed in % HDR and calculated similarly as for aspaltenes:

$$\%HDR=(R_o-R)/R_o \times 100$$

$R_o$: initial resin content
$R$: final resin content

The hydrodesulfurization rate is expressed in % HDS:

$$\%HDS=(S_o-S)/S_o \times 100$$

$S_o$: sulfur percent in the initial charge
$S$: remaining sulfur percent in the taken sample The metals (nickel and vanadium) are determined by atomic adsorption and their removal is expressed in the same manner:

$$\%HDNi=(Ni_o-Ni)/Ni_o \times 100$$

$$\%HDV=(V_o-V)/V_o \times 100$$

$Ni_o$, $V_o$: nickel and vanadium contents of the initial charge
$Ni$, $V$: nickel and vanadium contents in the liquid phase of the taken sample, settled.

The following examples illustrate the invention without however being limitative thereof. In these examples, the operation is conducted in the absence of air.

EXAMPLE 1

A cabimas vacuum residue, diluted with 20% of its weight of gas-oil, is treated for reducing its viscosity and the dissolved oxygen is removed under vacuum for about thirty minutes.

The analysis of the resulting mixture is given in Table 1.

Preparation of iron catalyst: the homogeneous catalytic solution is obtained by reducing 35.27 g of iron naphthenate, in solution in white-spirit, containing 5.67% by weight of iron (product available in the trade as siccative for paints and varnishes) by means of 12.05 g of triethylaluminum, under argon atmosphere, at 100° C., for about thirty minutes (Al/Fe=3).

This solution is used in a proportion of 10,000 ppm (iron weight per weight of heavy oil).

The hydrocarbon charge and the catalytic solution are introduced in an autoclave while operating under argon atmosphere. After the hydrogen pressure has been adjusted to 30 bars, stirring and heating are effected. After about 40 minutes, the reaction temperature of 390° C. is reached and said temperature is then maintained constant. The pressure is maintained at 90 bars by periodic addition of hydrogen.

After 6 hours of reaction, the experiment is stopped. A sample is taken. The results of the analysis, summarized in Table 1, as compared with those of the test from examples 2, 3, 4 and 5, show that the iron reduced by triethylaluminum is substantially more active than the non-reduced metal or the metal reduced directly in the asphaltene-containing hydrocarbon charge.

EXAMPLE 2

(Comparison)

The operating conditions of example 1 are repeated except that no catalyst is used. No demetalation, but only a slight increase in the asphaltene amount is observed. Results are reported in Table 1.

EXAMPLE 3

(Comparison)

The operating conditions of example 1 are repeated, except that instead of reduced iron naphthenate, there is used 10,000 ppm (calculated as iron) of non-reduced iron naphthenate (no triethylaluminum used). The results are reported in Table 1. A slight increase of the asphaltene content is observed. The demetalation is much lower than in example 1.

EXAMPLE 4

(Comparison)

The operating conditions are as in example 1 except that no iron naphtenate is used but exclusively triethylaluminum at a concentration of 15,000 ppm by weight of aluminum. The results are given in Table 1. By comparison with example 1, the results are clearly not as good.

EXAMPLE 5

(Comparison)

In this example, the same amounts of iron naphthenate and triethylaluminum as in example 1 are used, but these two compounds are introduced one after the other in the above-mentioned order, directly into the Cabimas heavy oil. The obtained results are clearly inferior to those obtained with the reduced iron catalyst previously prepared under the conditions described in example 1, before introduction in the charge. The results are given in Table 1.

EXAMPLE 6

Example 1 is exactly repeated but with a double reaction time. The experiment is stopped only after 12 hours of reaction. The results of the analysis (Table 2) show that the hydrotreatment reactions normally continue and result in high conversion rates, of about 90%.

In addition, the hydrotreatment transforms the initial charge to a much more fluid final product whose viscosity in particularly is considerably decreased as shown by the comparative measurements reported hereafter (Table 3).

TABLE 1

Cabimas Residue Hydrotreatment

The Cabimas residue is diluted with 20% of gas-oil; the obtained mixture contains by weight:
10.7% of asphaltene; 13.2% of resin; 2.3% of sulfur; nickel=60 ppm; vanadium: 470 ppm
Hydrotreatment temperature: 390° C.
Total operating pressure: 90 bars
Reaction time: 6 hours

| Ex. | % HDA | % HDR | % HDS | % HDNi | % HDV | CATALYST | CATALYST AMOUNT (ppm) |
|---|---|---|---|---|---|---|---|
| 1 | 45 | 70 | 27 | 56 | 58 | Iron naphthenate + Al(C$_2$H$_5$)$_3$ | 10,000 ppm of iron + 15,000 ppm of Al |
| 2 | 0 (slight increase) | — | 10.5 | 0 | 0 | Nil | 0 |
| 3 | 0 (slight increase) | 76.7 | 18 | 11 | 14.5 | Iron naphthenate | 10,000 ppm of iron |
| 4 | 8.7 | 77 | 16.1 | 12 | 16.5 | Al(C$_2$H$_5$)$_3$ | 15,000 ppm of Al |
| 5 | 6.0 | — | 19 | 13 | 17 | Successive addition of iron naphthenate and triethylaluminum in the Cabimas residue with 10,000 ppm of iron and 15,000 ppm of Al. | |

TABLE 2

| EX. | REACTION TIME (HOURS) | % HDA | % HDR | % HDS | % HDNi | % HDV |
|---|---|---|---|---|---|---|
| 1 | 6 | 45 | 70 | 27 | 56 | 58 |
| 6 | 12 | 66 | 83.2 | 39.6 | 89 | 88.3 |

TABLE 3

|  | VISCOSITY at 50° C. (m²/s) | SPECIFIC GRAVITY at 50° C. | POUR POINT °C. |
|---|---|---|---|
| Initial charge (before hydrotreatment) | 15.3 10⁻⁴ | 0.967 | +9 |
| Final product (after hydrotreatment) | 6.0 10⁻⁶ | 0.90 | −50 |

Finally, it is observed that the soluble catalyst initially introduced into the Cabimas charge is converted during the hydrotreatment into a very fine sulfur powder. Practically, no soluble reduced iron remains in the liquid phase of the final product; as a matter of fact, when inspected by atomic adsorption, only an iron content lower than 2 ppm remains compared to the initial 10,000 ppm.

EXAMPLE 7

The product from the preceding example is diluted with 200 ml of toluene and then the resulting solution is filtered on a 0.45 micron micropore filter. The so-recovered fine powder is reintroduced into the autoclave with the filter and with a new charge of Cabimas residue. The hydrotreatment step as described in example 1 is then exactly repeated. After 6 hours of reaction, the analyses of the taken sample give the following results:

| % HDA = 38 | % HDS = 33 | % HDNi = 45 |
|---|---|---|
| % HDR = 72 |  | % HDV = 51 |

These results are not substantially different from those of example 1 and confirm the results obtained by continuing the hydrotreatment up to 12 hours as described in example 6. This shows the possibility and the advantage of recycling the catalyst separated either by mere decantation or by centrifugation or by any other liquid-divided solid separating method.

EXAMPLE 8

The hydrotreatment test of example 1 is repeated except that the catalytic solution obtained by reduction of iron naphthenate with triethylaluminum (Al/Fe=3) is sulfurized by means of hydrogen sulfide before being admixed with the hydrocarbon charge.

The determinations effected on the taken sample after 6 hours of reaction give the following results:

| % HDA = 47 | % HDS = 43 | % HDNi = 53 |
|---|---|---|
| % HDR = 75 |  | % HDV = 57 |

These results show that it is possible to obtain a very active catalyst by sulfiding with H₂S of the homogeneous catalytic solution.

EXAMPLE 9

The hydrotreatment test of example 1 is repeated, except that the heavy hydrocarbon to be treated is a mixture obtained by steam extraction of asphaltic Athabasca sands (Canada) and in that the catalyst is a supported homogeneous catalyst obtained by impregnating a macropore alumina carrier (pore volume=1 cc/g, specific surface=100 m²/g) by means of a homogeneous solution of reduced iron (Al/Fe=3).

With 50 g of this solid catalyst containing 1.26% by weight of iron, previously sulfurized with H₂S, the results below show that iron reduced by triethylaluminum, and applied to a carrier, is also very active. The analysis of the sample taken after 6 hours of reaction gives the following results:

| % HDA = 35 | % HDS = 32 | % HDNi = 49 |
|---|---|---|
| % HDR = 72 |  | % HDV = 54 |

EXAMPLE 10

The hydrotreatment of the Cabimas vacuum residue is effected as in example 1 but the amount of reduced iron is much lower, 600 ppm by weight of iron instead of 10,000 ppm (Al/Fe=3). After 12 hours of reaction at 410° C., the results of the analysis are as follows:

| % HDA = 18 | % HDS = 15 | % HDNi = 22 | % HDV = 26 |
|---|---|---|---|

EXAMPLE 11

Two comparative tests are effected according to the technique described in example 1 but the catalysts have a molybdenum basis; the first one is non-reduced molybdenum naphthenate, the second is molybdenum naphthenate reduced with triethylaluminum (Al/Mo=3). The results are summarized in Table 4 below.

TABLE 4

| CATALYST | MOLYBDENUM = 8 000 ppm by weight | | | | | REACTION TIME (hours) |
|---|---|---|---|---|---|---|
|  | % HDA | % HDR | % HDS | % HDNi | % HDV |  |
| Mo Naphthenate | 27 | 75 | 29 | 15 | 19.2 | 6 |
| Mo Naphthenate | 46.6 | 79.5 | 39.1 | 69.3 | 71 | 6 |
| + Al(C₂H₅)₃ | 54 | 90.1 | 45.6 | 82.8 | 87.5 | 12 |

It is observed that the reduced catalyst is clearly more active, particularly as far as demetalation is concerned.

EXAMPLE 12

The test described in example 1 is repeated except that the catalyst is reduced vanadium, obtained by reduction of vanadium octylphosphate with triethylaluminum (Al/V=3).

The concentration of reduced vanadium is 9,200 ppm by weight.

After 6 hours of reaction, the analyses give the following results:

| % HDA = 63.2 | % HDS = 36.5 | % HDNi = 87.5 |
|---|---|---|
| % HDR = 85.6 |  | % HDV = 86.1 |

The Vanadium, reduced with triethylaluminum, is consequently a very active catalyst for the hydrotreatment of residues.

EXAMPLE 13

The test of example 1 is repeated but with a catalyst consisting of nickel octoate, reduced with triethylaluminum (Al/Ni=3).

The nickel concentration was 10,000 ppm by weight. The following results were obtained:

| % HDA = 22 | % HDS = 18.5 | % HDNi = 18 |
|---|---|---|
| % HDR = 45 | | % HDV = 21 |

EXAMPLE 14

The test of example 1 is repeated but with a catalyst consisting of cobalt octoate reduced with triethylaluminum (Al/Co=3).

The cobalt concentration was 8,900 ppm by weight.

After 6 hours of reaction, the analysis results were as follows:

| % HDA = 23 | % HDS = 21 | % HDNi = 20.5 |
|---|---|---|
| % HDR = 46 | | % HDV = 26 |

EXAMPLE 15

The test of example 1 is repeated but with a catalyst consisting of a solution obtained by reducing by means of triethylaluminum a mixture of molybdenum naphthenate and cobalt octoate, with atomic ratios Al/Mo+Co=3 and Mo/Co=3.

With a Mo+Co concentration of 3,000 ppm by weight, the analyses of the taken sample, after 6 hours of reaction, give the following results:

| % HDA = 39 | % HDS = 27 | % HDNi = 49.5 |
|---|---|---|
| % HDR = 68 | | % HDV = 53 |

This example shows that the catalytic solution of a mixture of two salts in the present case cobalt and molybdenum, reduced with triethylaluminum, can give a very active catalyst for the hydrotreatment of heavy residues.

EXAMPLE 16

The test described in example 1 is repeated but the catalyst consists of a solution obtained by reduction of nickel octoate and molybdenum naphthenate by means of triisobutylaluminum in the following atomic ratios:

Mo/Ni=3 and Al/Mo+Ni=3

This catalyst is used at a concentration of 3,200 ppm by weight; the analyses of the final reaction product, after 6 hours, give the following results:

| % HDA = 35 | HDS = 31 | % HDNi = 59 | % HDV = 60.5 |
|---|---|---|---|

EXAMPLE 17

The test described in example 1 is repeated but the catalyst is a mixture of nickel octoate and iron octoate, reduced by means of triethylaluminum with the following atomic ratios:

Ni/Fe=3 and Al/Fe+Ni=3

With a metal concentration, nickel plus iron, equal to 4,000 ppm by weight, the analysis of the reaction liquid phase, after 6 hours, gives the following results:

| % HDA = 28 | % HDS = 27 | % HDNi = 32 | % HDV = 34 |
|---|---|---|---|

EXAMPLE 18

The test described in example 1 is repeated, but with a catalyst of molybdenum naphthenate reduced with triethylaluminum (Al/Mo=3). The mixture of heavy hydrocarbons is a product issued from coal hydroliquefaction. The characteristics of the charge and of the product, after 6 hours of reaction, with 7,000 ppm by weight of molybdenum, are reported in the following table. An increase of the product fluidity is observed at the end of the reaction.

| OPERATING CONDITIONS: | T = 390° C. | Duration: |
|---|---|---|
| | P = 150 bars | 6 hours |
| Elemental analysis (% b.w.) | Non treated charge | Treated product |
| C | 88.6 | 90 |
| H | 6.73 | 7.36 |
| O | 2.16 | 1.18 |
| N | 0.99 | 0.52 |
| S | 1.52 | 0.86 |

EXAMPLE 19

The test described in example 1 is repeated but the catalyst is tungsten stearate reduced with triethylaluminum (Al/W=3).

Because tungsten organic salts are not easily available the tungsten stearate is obtained by reacting tungsten hexacarbonyl with stearic acid.

The concentration of reduced tungsten is 7,800 ppm by weight.

After 6 hours of reaction, the following results are obtained:

| % HDA = 43.5 | % HDS = 38.2 | % HDNi = 67 |
|---|---|---|
| % HDR = 77.5 | | % HDV = 65.8 |

EXAMPLE 20

The test of example 1 is repeated, except that the catalyst is obtained by reducing chromium acetylacetonate with triethylaluminum (Al/Cr=3).

The chromium concentration is 7,250 ppm by weight. After 6 hours of reaction, the analyses give the following results:

| % HDA = 43.3 | % HDS = 37.7 | % HDNi = 68.0 |
|---|---|---|
| % HDR = 78.0 | | % HDV = 62.1 |

EXAMPLE 21

The test described in example 1 is repeated. The catalyst is ruthenium acetylacetonate reduced with triethylaluminum (Al/Ru=3).

The ruthenium concentration is 9,200 ppm by weight.

After 6 hours of reaction, the results of the analysis are as follows:

| % HDA = 29.5 | % HDS = 36.9 | % HDNi = 59.5 |
| % HDR = 77.2 | | % HDV = 62.8 |

EXAMPLE 22

The test described in example 1 is repeated but the catalyst is rhenium stearate reduced with triethylaluminum.

The rhenium carboxylate is obtained by reaction of rhenium pentacarbonyl with stearic acid.

The rhenium concentration in this test is 8,900 ppm by weight.

The analyses of the taken sample, after 6 hours of reaction, give the following results:

| % HDA = 39 | % HDS = 43.2 | % HDNi = 63.3 |
| % HDR = 82 | | % HDV = 65 |

EXAMPLE 23

Example 12 is repeated except that the vanadium concentration is only 4,800 ppm by weight.

The reaction product is distilled, after 6 hours. The results are as follows (% by weight of distilled fractions).

| | | INITIAL CHARGE (Cabimas residue + gas oil) | PRODUCT OF EXAMPLE 23 |
|---|---|---|---|
| Fraction | 80–180° C. | 0 | 10.6 |
| | 180–230° C. | 3.32 | 6.1 |
| | 230–320° C. | 21.35 | 29.2 |
| | 320–375° C. | 8.1 | 10.2 |
| | 375–510° C. | 1.84 | 10.2 |
| | >510° C. | 65.4 | 34.1 |

What is claimed is:

1. A process for hydrotreating a heavy hydrocarbon charge containing sulfur and asphaltenes, in the liquid phase, comprising contacting said charge with hydrogen, at a temperature of 250°–500° C. and a pressure of 20–350 bars, in the presence of a preformed catalyst prepared by reacting at least one transition metal organic compound with at least one organic aluminum compound, in a hydrocarbon solvent which is substantially free of asphaltenes, said transition metal being titanium, zirconium, vanadium, chromium, molybdenum, tungsten, manganese, rhenium, iron, ruthenium, cobalt, nickel, copper, zinc or tin.

2. A process according to claim 1, wherein said at least one transition metal organic compound is an iron, nickel, cobalt, molybdenum, tungsten or vanadium acetylacetonate or carboxylate.

3. A process according to claim 1, wherein said at least one transition metal organic compound is vanadium alkyl- or arylphosphate.

4. A process according to claim 1, wherein said organic aluminum compound has the formula Al R' R" R'", wherein at least one of R', R" or R'" is a monovalent hydrocarbon radical or an alkoxy radical and the others are hydrogen, monovalent hydrocarbon radicals or alkoxy radicals.

5. A process according to claim 1, wherein the catalyst amount is from 20 to 10,000 parts by weight, expressed as weight of transition metal, per million parts by weight of hydrocarbons subjected to the hydrotreatment and wherein the ratio between the atomic amounts of the aluminum of the organic aluminum compound and the metal or metals of the transition metal organic compound is comprised between 0.1:1 and 15:1.

6. A process according to claim 1, wherein said preformed catalyst is prepared using a mixture of transition metal organic compounds, the mixture being a mixture of molybdenum and cobalt organic compounds, or a mixture of molybdenum and nickel organic compounds or a mixture of nickel and tungsten organic compounds.

7. A process according to claim 1, wherein the catalyst is sulfided after admixture with the heavy hydrocarbon charge.

8. A process according to claim 1, wherein said temperature is 320°–450° C. and said pressure is 90–200 bars.

9. A process according to claim 1, wherein said catalyst is prepared as a solution in said hydrocarbon solvent and then applied to a carrier and used as a supported catalyst.

10. A process according to claim 1, wherein said heavy hydrocarbon charge contains at least 0.5% by weight of sulfur and a total of at least 1% by weight of asphaltenes and resins.

11. A process according to claim 4, wherein said organic aluminum compound is triethylaluminum or triisobutylaluminum.

12. A process according to claim 1, wherein said hydrocarbon solvent boils between 30° C. and 250° C.

13. A process according to claim 12, wherein said solvent is a $C_5$ fraction, a gasoline fraction, a naphtha fraction or a kerosene fraction.

14. A process according to claim 6, wherein the atomic ratio of metals in said mixture is from 0.1:1 to 10:1.

15. A process according to claim 1, which further comprises the step of recovering and recycling catalyst after said contacting step.

* * * * *